(12) United States Patent
Chen et al.

(10) Patent No.: US 7,548,300 B2
(45) Date of Patent: Jun. 16, 2009

(54) FABRICATION METHOD OF LIQUID CRYSTAL DISPLAY PANEL AND HEATING APPARATUS USED THEREIN

(75) Inventors: Chien-Ming Chen, Tao-Yuan Hsien (TW); Kei-Hsiung Yang, Tao-Yuan Hsien (TW)

(73) Assignee: HannStar Display Corp., Yang-Mei, Tao-Hsien (TW)

( * ) Notice: Subject to any disclaimer, the term of this patent is extended or adjusted under 35 U.S.C. 154(b) by 627 days.

(21) Appl. No.: 10/907,958

(22) Filed: Apr. 22, 2005

(65) Prior Publication Data
US 2005/0275791 A1 Dec. 15, 2005

(30) Foreign Application Priority Data
Jun. 15, 2004 (TW) .............................. 93117193 A
Sep. 23, 2004 (TW) .............................. 93128876 A

(51) Int. Cl.
G02F 1/1341 (2006.01)
G02F 1/1339 (2006.01)

(52) U.S. Cl. ................... 349/190; 349/187; 349/189

(58) Field of Classification Search ................. 349/189, 349/190
See application file for complete search history.

(56) References Cited

U.S. PATENT DOCUMENTS 4,626,303 A * 12/1986 Ogura ...................... 156/145
5,269,351 A * 12/1993 Yoshihara ...................... 141/7
5,548,428 A * 8/1996 Masaki et al. ................ 349/189
5,847,782 A * 12/1998 Imazeki et al. ................. 349/58
5,959,712 A * 9/1999 Morii et al. ................... 349/190
6,086,443 A 7/2000 Shin et al.
6,191,841 B1* 2/2001 Ootaguro et al. ............. 349/190
6,208,405 B1 3/2001 Sakong et al.
6,290,793 B1 9/2001 Lovas et al.
6,313,894 B1 11/2001 Sekine et al.
6,683,670 B2 1/2004 Chung et al.
7,291,238 B2* 11/2007 Murouchi et al. ............ 156/145
2002/0018165 A1* 2/2002 Youn ........................... 349/139
2004/0069612 A1* 4/2004 Nakata et al. ............ 204/157.15
2005/0206833 A1* 9/2005 Nam et al. ................... 349/189

FOREIGN PATENT DOCUMENTS

JP 57045522 3/1982

* cited by examiner

Primary Examiner—Michael H Caley
(74) Attorney, Agent, or Firm—Winston Hsu

(57) ABSTRACT

A fabricating method of a liquid crystal display panel provides a first substrate and a second substrate. The first substrate has a sealant used for sealing with the second substrate to form a liquid crystal cavity. The first substrate and the second substrate are placed into a chamber to perform a liquid crystal filling process. An end seal process is performed at a predetermined temperature higher than room temperature to seal the liquid crystal with a predetermined weight into the liquid crystal cavity. A liquid crystal injection method, an end seal process, and heating apparatus are also provided.

25 Claims, 12 Drawing Sheets

FABRICATION METHOD OF LIQUID CRYSTAL DISPLAY PANEL AND HEATING APPARATUS USED THEREIN

BACKGROUND OF INVENTION

1. Field of the Invention

The present invention relates to a method and apparatus for fabricating liquid crystal displays, and particularly to a method and apparatus for fabricating liquid crystal displays preventing a gravity mura problem from occurring.

2. Description of the Prior Art

A liquid crystal display (LCD) has advantages of lightness, low power consumption, less radiation and applied to various portable electronic products such as notebook computers and personal digital assistants (PDAs). In addition, LCD monitors and LCD televisions are gaining popularity as a substitute for traditional cathode ray tube (CRT) monitors and televisions.

The LCD panels are usually viewed at a standing-up position, and gravity will change the pressure balance of the liquid crystal inside the LCD panel. "Standing-up position" means a position such that the direction along panel thickness is in the horizontal direction or approximately perpendicular to the earth-gravity direction. Please refer to FIG. 1, which is a schematic diagram of a standing-up conventional LCD panel. The LCD panel 100 has two glass substrates 102 and 104, and liquid crystal 106 is filled between the glass substrates 102 and 104 and is encapsulated by a sealing area 108. When the LCD panel 100 is in a standing-up position, three kinds of forces, which are shown as F1, F2, and F3 in FIG. 1, act onto the contact face of the liquid crystal 106 in the bottom region of the LCD panel 100 and the glass substrate 102 or 104. The arrows indicate the directions of F1, F2, and F3. The first force F1 is due to a pressure difference between the liquid crystal 106 in the LCD panel 100 and the ambient. The second force F2 is due to the capillarity of the liquid crystal 106. The third force F3 is due to the gravity force of the liquid crystal 106.

When the sum of the pulling forces F1 and F2 is larger than or equal to the pushing force of F3, the liquid crystal 106 in the LCD panel 100 is in a pressure balanced condition, and the images can be normally displayed. If the sum of the pulling forces F1 and F2 is smaller than the pushing force of F3, a gravity mura, or gap mura, will happen at the bottom region of the standing-up LCD panel 100, and seriously worsen the image quality. Accordingly, to prevent from the mura defects, a relation of F1+F2>F3 must be maintained, in which F2 and F3 each is approximately a fixed value, and F1 remarkably varies with the variation of temperature.

Please refer to FIG. 2. FIG. 2 is a schematic cross sectional diagram showing a conventional LCD panel 200 horizontally positioned. The LCD panel 200 comprises two glass substrates 202 and 204 assembled by a sealing area 208. A liquid crystal cavity (LC cavity) 210 is defined by a plurality of spacers 212 between the glass substrates 202 and 204 inside the sealing area 208. Liquid crystal 206 is filled in to the LC cavity 210. The spacers 212 are used to maintain a predetermined gap between the two glass substrates 202 and 204. At room temperature, the surface of the two glass substrates 202 and 204 is flat and the pressures inside and outside the LC cavity are substantially same, that is, force F1 shown in FIG. 1 is equal or approximate to 0. The weight of the liquid crystal 206 in the LC cavity 210 is defined as a standard liquid crystal filling weight.

However, at a high temperature, as shown in FIG. 3, because liquid crystal 206 has a thermal expansion coefficient more than those of the glass substrate 202, 204 and spacers 212, the glass substrate 202, 204 will bulge outward. The internal pressure of the LC cavity 210 is higher than the external pressure, that is, the force F1 shown in FIG. 1 is less than 0. In such situation, LCD panel 200 cannot comply with the relation of F1+F2>F3, that is, the LCD panel 200 will have a gravity defect in a high temperature environment. Such defect is especially significant in the manufacturing of large size LCD panels.

Most conventional end seal processes for display panels adopt a multistage pressure increase/decrease method, however, the panels manufactured tend to have a gravity defect and other mura problems as mentioned above, especially for a large size display panel.

For example, U.S. Pat. Nos. 6,086,443 and 6,208,405 disclose a sealing method for panels and attempt to eliminate the mura on LCDs or form uniform liquid crystal cell gap. Please refer to FIG. 4 showing the time-pressure curve during the end-seal process of U.S. Pat. No. 6,086,443. During initial T1 time, the pressure gradually increases from P1 to P2. During the next T2 time, the residual amount of the liquid crystal filled in the liquid crystal cell is discharged by maintaining the pressure P2 constantly. Next, with maintaining the pressure P2, a sealant is applied to the injection hole. During the next T3 time, the pressure decreases from P2 to P3, and during the next T4 time, the sealant is flattened with maintaining the pressure P3 constantly. Finally, after the end-seal sealant is hardened by the ultraviolet (UV) irradiation, the pressure is eliminated. However, in the multi-stage pressure end-seal process, the panel is not heated, which is only heated when compressing the two glass substrates and structurally attaching the sealant and the substrates together in order to define a cell cavity, and the gravity defect and other mura problems are not solved.

SUMMARY OF INVENTION

Accordingly, an object of the present invention is to provide a method of fabricating an LCD panel to prevent the display from a gravity mura problem.

Another object of the present invention is to provide a method of liquid crystal injection to be utilized in the manufacturing of LCD device.

Still another object of the present invention is to provide an end seal process for an LCD for utilization in the manufacturing of LCD device to prevent the display from a gravity mura problem.

Still yet another object of the present invention is to provide a heating apparatus for use in an end seal process for an LCD panel, for utilization in the manufacturing of LCD device to prevent the display from a gravity mura problem.

Still yet another object of the present invention is to provide a heating apparatus in another aspect for use in an end seal process for an LCD panel.

The method of manufacturing an LCD panel according to the present invention comprises, first, providing a first substrate and a second substrate, the first substrate having a first sealant used for sealing with the second substrate to form an LC cavity; next, placing the first substrate and the second substrate in a chamber to perform a liquid crystal filling process; and, subsequently, performing an end seal process at a predetermined temperature higher than room temperature to seal the liquid crystal with a predetermined weight into the LC cavity.

The method of liquid crystal injection according to the present invention comprises providing a first substrate and a second substrate, the first substrate having a first sealant used for sealing with the second substrate to form an LC cavity;

and, subsequently, filling liquid crystal with a predetermined weight into the LC cavity, wherein the liquid crystal with the predetermined weight at a predetermined temperature higher than room temperature has a volume substantially equal to a volume acquired by the LC cavity at the predetermined temperature.

The end seal process for an LCD according to the present invention comprises providing an LCD panel; heating the LCD panel to a predetermined temperature; applied a first predetermined pressure to the LCD panel; maintaining the predetermined temperature and the first predetermined pressure for a first time period; reducing the first predetermined pressure applied to the LCD panel to a second predetermined pressure; sealing the LCD panel at the predetermined temperature; maintaining the predetermined temperature and the second predetermined pressure for a second time period; and removing the second predetermined pressure and lowering the predetermined temperature to room temperature.

The heating apparatus according to the present invention is for use in an end seal process for an LCD panel to heat a plurality of LCD panels. The heating apparatus comprises a plurality of heat conducting plates, a plurality of buffer plates, and a pressing device. The buffer plates are disposed between the LCD panel and the heat conducting plate respectively. The pressing device is disposed at the most out heat conducting plate.

The heating apparatus according to the present invention is suitable for use in an end seal process for an LCD panel to heat a plurality of LCD panels. The heating apparatus comprises a heating chamber, a heating element, and a pressing device. The heating chamber comprises a gas inlet for conducting a gas into the heating chamber and a plurality of slots for placing the LCD panels. The heating element is disposed on the wall of the heating chamber to heat the gas in the heating chamber. The pressing device is disposed at the heating chamber for compressing the gas.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
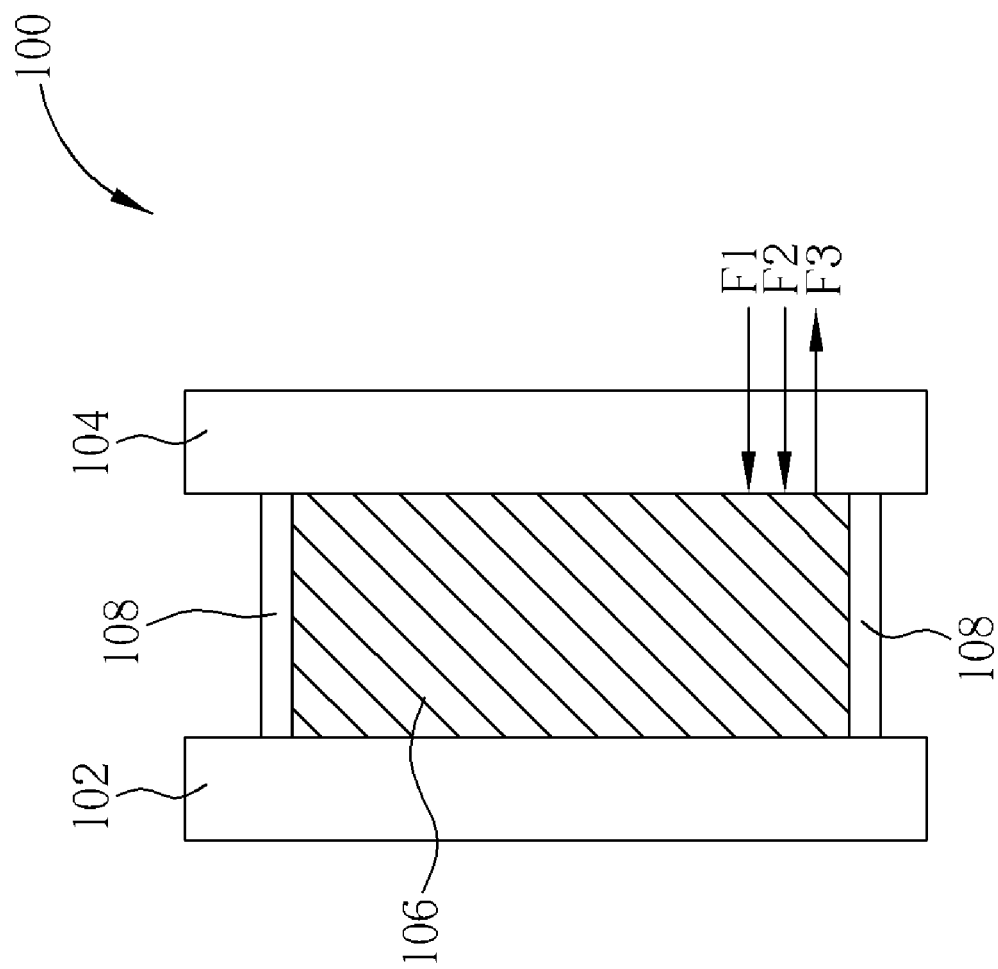
FIG. 1 is a schematic cross sectional diagram showing a conventional LCD panel in a standing-up position.
Figure 2:
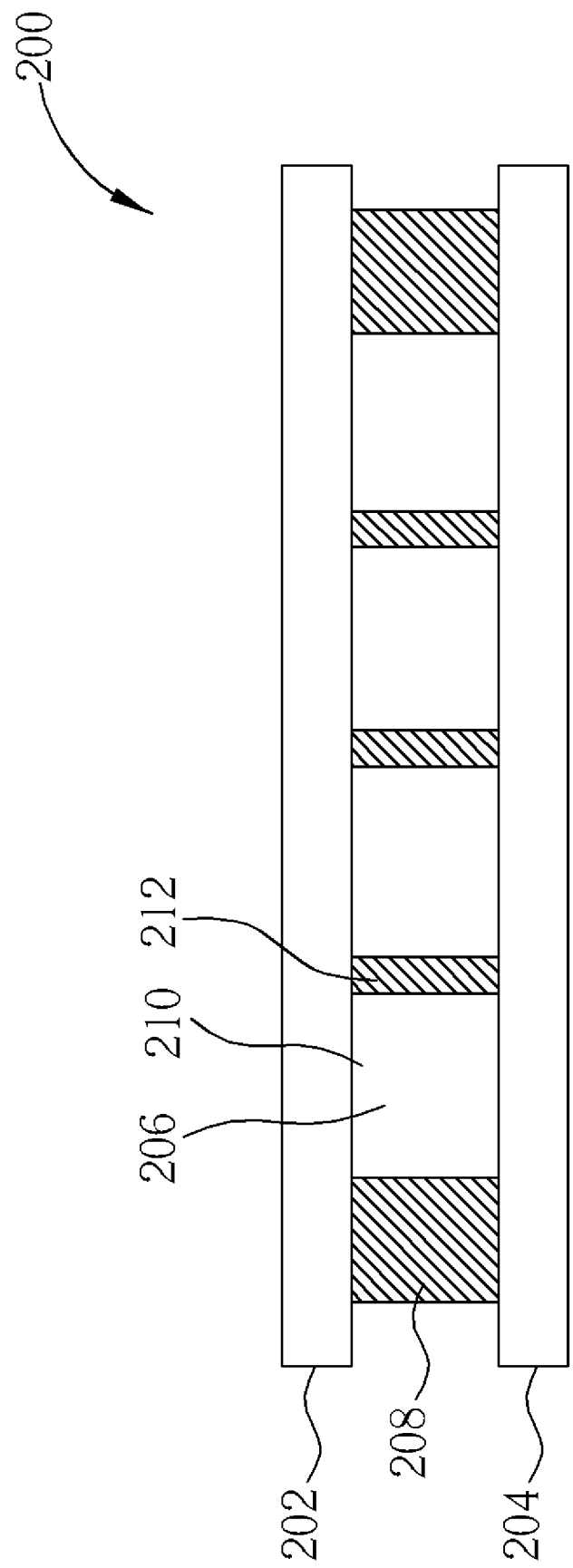
FIG. 2 is a schematic cross sectional diagram showing a conventional LCD panel positioned horizontally.
Figure 3:
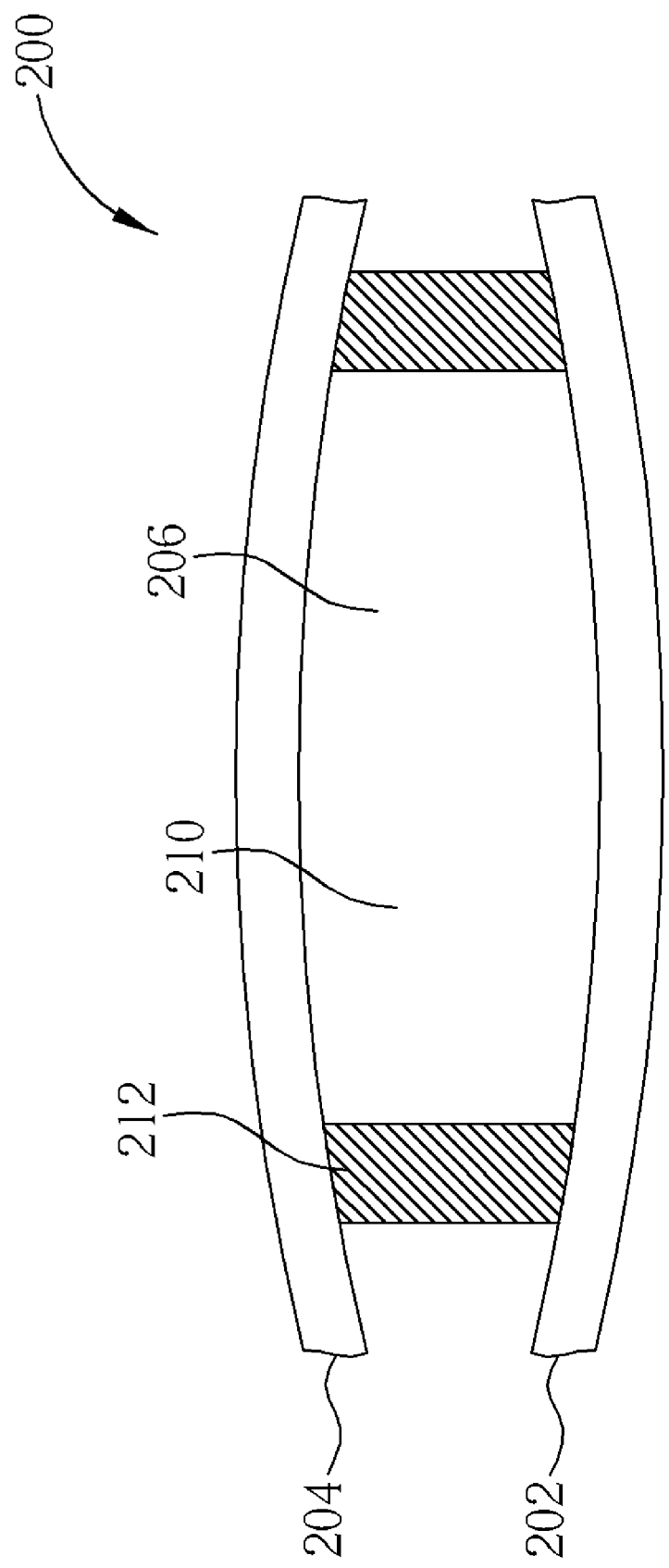
FIG. 3 is a schematic cross sectional diagram showing a conventional LCD panel positioned horizontally in an environment at a high temperature.
Figure 4:
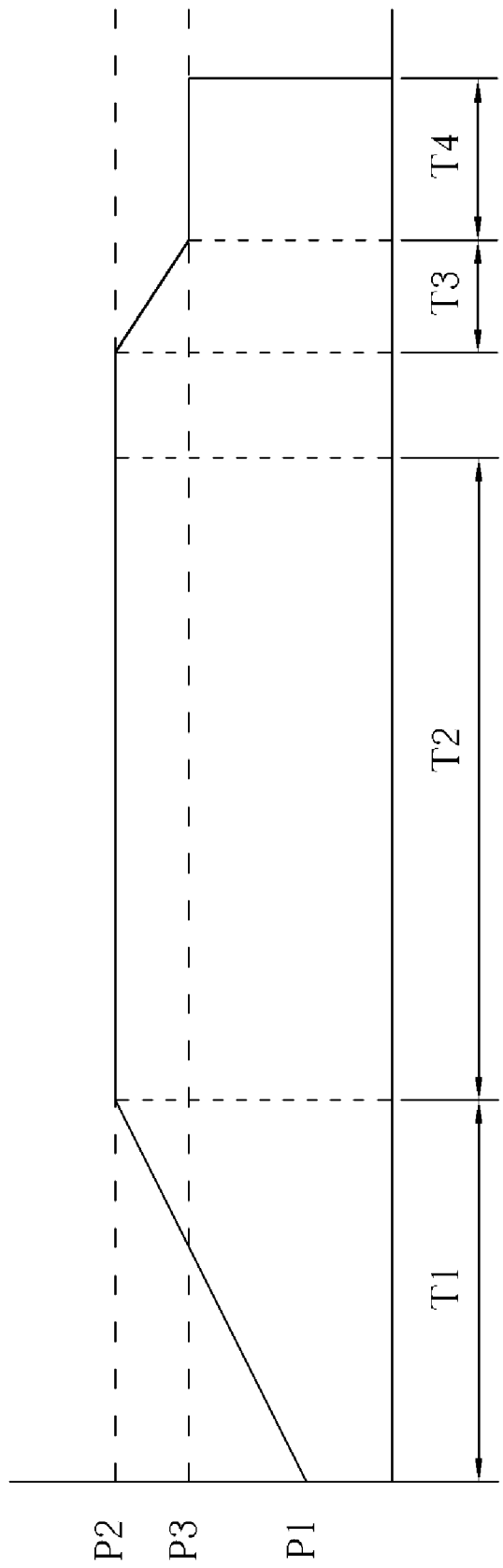
FIG. 4 shows a time-pressure plotting during a conventional end seal process.
Figure 5:
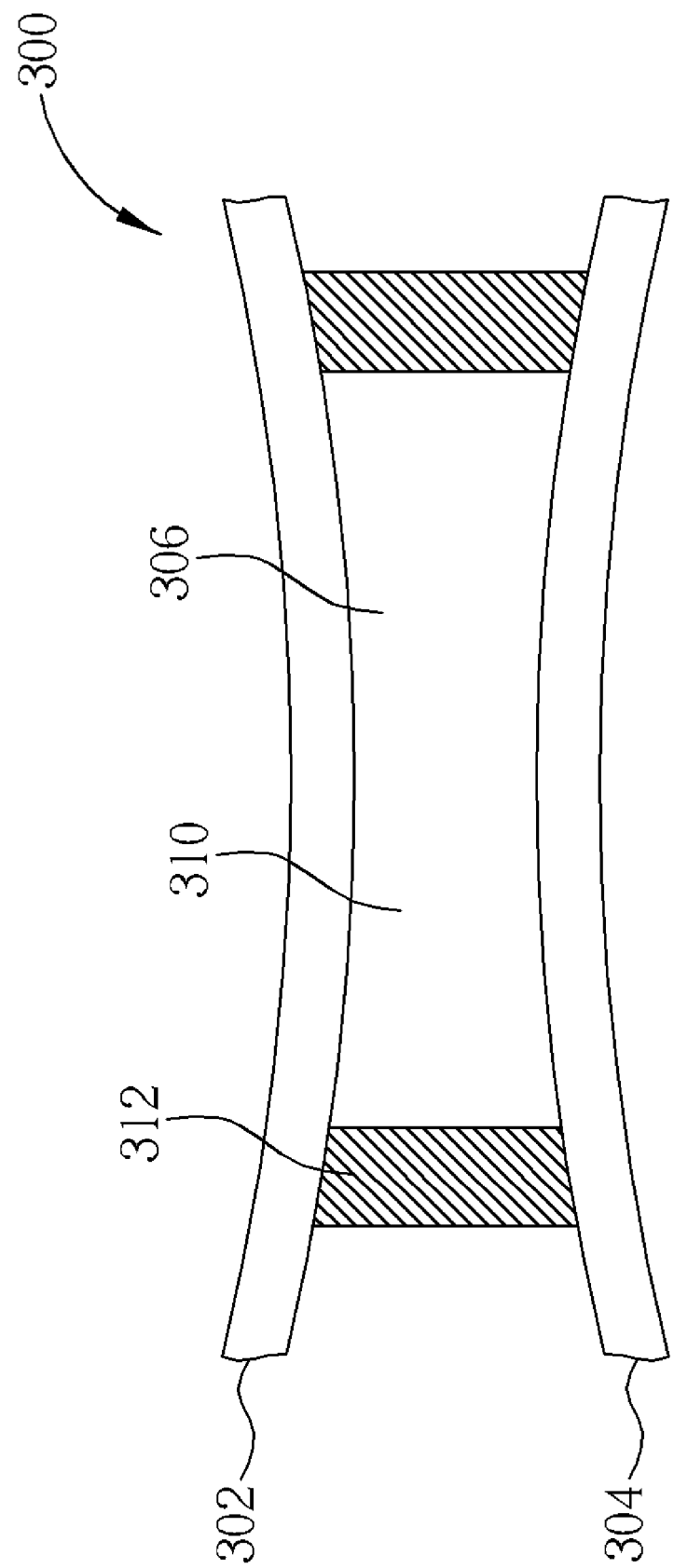
FIG. 5 is a schematic cross sectional diagram showing the LCD panel manufactured using the method according to the present invention.

Please refer to FIG. 5, a schematic cross sectional diagram showing the horizontally positioned LCD panel 300 manufactured using the method according to the present invention. The LCD panel 300 has a similar structure to the LCD panel 200. The two glass substrates 302, 304 of the LCD panel 300 are spaced by spacers 312 to form an LC cavity 310. At room temperature, the internal pressure of the LC cavity 310 is lower than the external pressure, that is, the force F1 as shown in FIG. 1 is positive, and such that a slightly concave surface is formed on each of the glass substrates 302, 304. When the LCD panel 300 is placed in a high temperature environment, the glass substrates 302, 304 will have a flat surface. That is, the force F1 will be equal or approximate to 0, such that the relation of F1+F2>F3 is satisfied and the gravity mura will not occur. The glass substrates 302, 304 can be substituted with other material, such as plastic.

The method of fabricating an LCD panel 300 according to the present invention is further described hereinafter. The first embodiment of the method is to fill liquid crystal 306 by a vacuum suction method to form the LCD panel 300. First, a panel comprising two glass substrates 302, 304 and at least one pixel controlling circuit thereon is provided. The glass substrates 302, 304 are assembled with a sealing area, and at least an injection hole is reserved during the assembly for the subsequently injection of liquid crystal 306. An LC cavity 310 for accommodating liquid crystal 306 is formed after the glass substrates 302, 304 are assembled by a first sealant, and a plurality of spacers 312 are disposed between the glass substrates 302 and 304 to keep a certain gap between the two glass substrates 302 and 304. Next, the panel is placed into a liquid crystal injection chamber. The liquid crystal injection chamber is a vacuum chamber in a vacuum state. A liquid crystal filling process is performed to inject liquid crystal with a first predetermined weight into the LC cavity 310. The liquid crystal with the first predetermined weight is sucked into the LC cavity 310 and completely fills it by means of the capillary effect of the LC cavity 310 in the liquid crystal filling process. The liquid crystal and the glass substrates 302, 304 may be at room temperature or be heated to 30 to 80° C. during the liquid crystal filling process.

Figure 8:
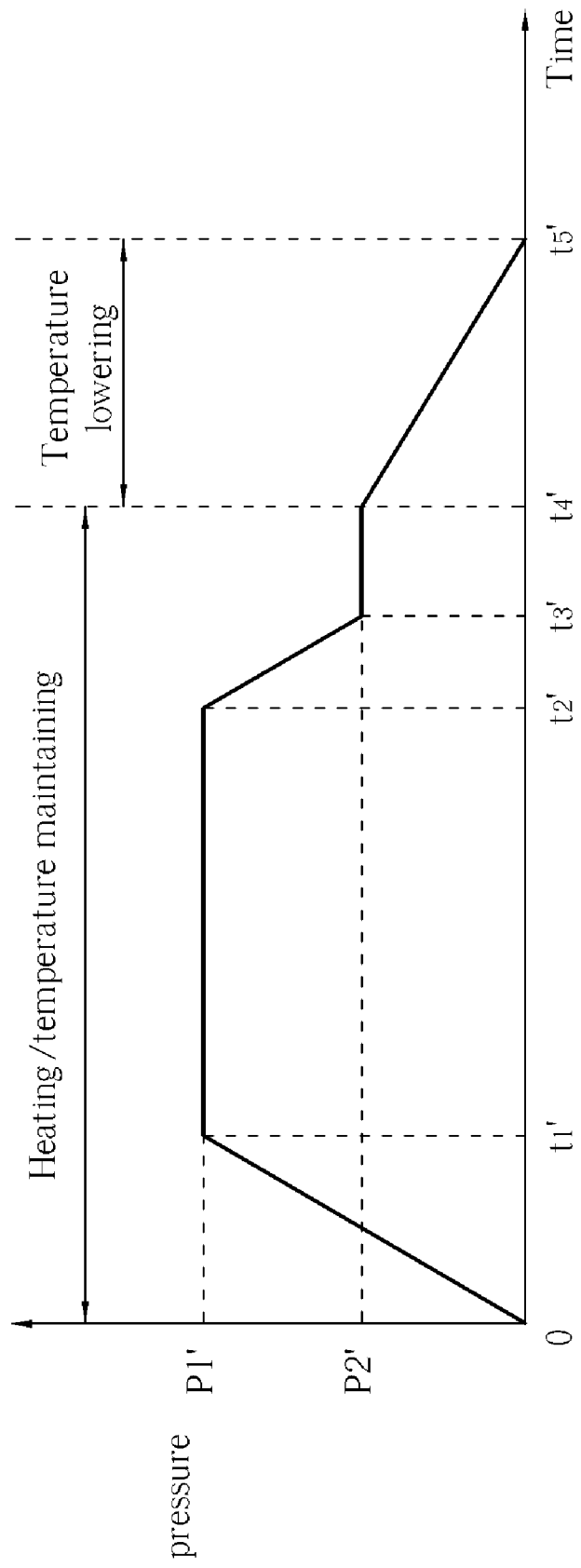
FIG. 8 shows a time-pressure plotting during the end seal process according to the present invention.

After the liquid crystal with the first predetermined weight is filled, an end-seal process of the invention is proceeding. As shown in FIG. 8, the liquid crystal and the glass substrates 302, 304 are continuously heated to keep the temperature in the range of 30 to 80° C. and a predetermined pressure P1' is exerted to the glass substrates 302, 304 to overflow a certain amount of liquid crystal and allow the glass substrates 302, 304 to keep a flat surface. The pressure P1' is suggested to be in the range of $3.0 \times 10^4$ to $6.5 \times 10^4$ Pa, and the heating temperature and the pressure P1' applied may be maintained for a period of time, for example, a period of time from t1' to t2'. The time period is almost proportional to the area of the LCD panel. For a panel having a diagonal size of 15 inches, the time period is suggested to be in the range of 0.5 to 1.5 hours to reach a balance state and good for the discharge of liquid crystal.

After the overflowed liquid crystal is cleaned up, a second sealant is applied to the liquid crystal injection hole and the pressure exerted to the glass substrates 302, 304 decreases from P1' to P2' during the period of time from t2' to t3', such that the second sealant enters into the liquid crystal injection hole, which may be a UV sensitive glue cured by the UV irradiation. The pressure P2' is suggested in the range of $2.0 \times 10^4$ to $5.0 \times 10^4$ Pa and may be maintained with the heating temperature for a period of time, for example, a period of time from t3' to t4'. The time period is almost proportional to the area of the LCD panel. For a panel having a diagonal size of 15 inches, the time period is suggested in the range of 2 to 4 minutes to reach a balance state. When the pressure P1' or P2' is exerted on the panel, the direction of the panel position is not limited. It is preferably in the standing-up position.

At last, the pressure exerted to the glass substrates 302, 304 decreases from P2' to 0 in a period of time from t4' to t5', and the temperature of the panel is lowered to room temperature. The end-seal process for LCD panels is accomplished. Therefore, a liquid crystal 306 with a second predetermined weight is encapsulated inside the LC cavity 310, completing the manufacturing of the LCD panel 300. The second predetermined weight can be controlled by the heating temperature of the glass substrates 302, 304 and generally in the range of about 95% to 99.5% of the standard liquid crystal filling weight, which is the weight of liquid crystal filled in the LC cavity 310 and make the surfaces of the two glass substrates 302, 304 flat at room temperature.

As compared to a conventional end-seal process for LCD panels, the end-seal process according to the present invention is applying a predetermined pressure to the glass substrates to discharge a part of liquid crystal and simultaneously heating the glass substrates to a predetermined temperature; therefore, the mura problem can be inhibited in the LCD panel such obtained.

The second embodiment of the method is to fill liquid crystal 306 by a one drop fill (ODF) method to form the LCD panel 300. First, a panel comprising two glass substrates 302, 304 and at least one pixel controlling circuit thereon is provided. Next, a sealing area is formed in the perimeter portion of at least one of the glass substrates 302 and 304. The area surrounded by the sealing area is the area to accommodate liquid crystal by the ODF method. In addition, a plurality of spacers 312 are disposed on the glass substrate 302 or 304 to keep a certain gap between the two glass substrates 302 and 304 in the subsequent processes.

The two glass substrates 302, 304 are placed into a liquid crystal injection chamber. The liquid crystal injection chamber is a vacuum chamber in a vacuum state and at a high temperature. Subsequently, the ODF method is performed to drop liquid crystal 306 on the glass substrate 302 or 304. The weight of the liquid crystal 306 filled is less than the standard liquid crystal filling weight. For example, the weight of the liquid crystal 306 filled may be in the range of about 95% to 99.5% of the standard liquid crystal filling weight, which is the weight of liquid crystal filled into the LC cavity 310 and make the surfaces of the two glass substrates 302, 304 flat at room temperature. After the drop filling of the liquid crystal 306, the two glass substrates 302 and 304 are assembled to form an LC cavity 310 and the liquid crystal 306 is encapsulated inside the LC cavity 310. At this time, the glass substrates 302, 304 have a flat surface at the high temperature.

Figure 6:
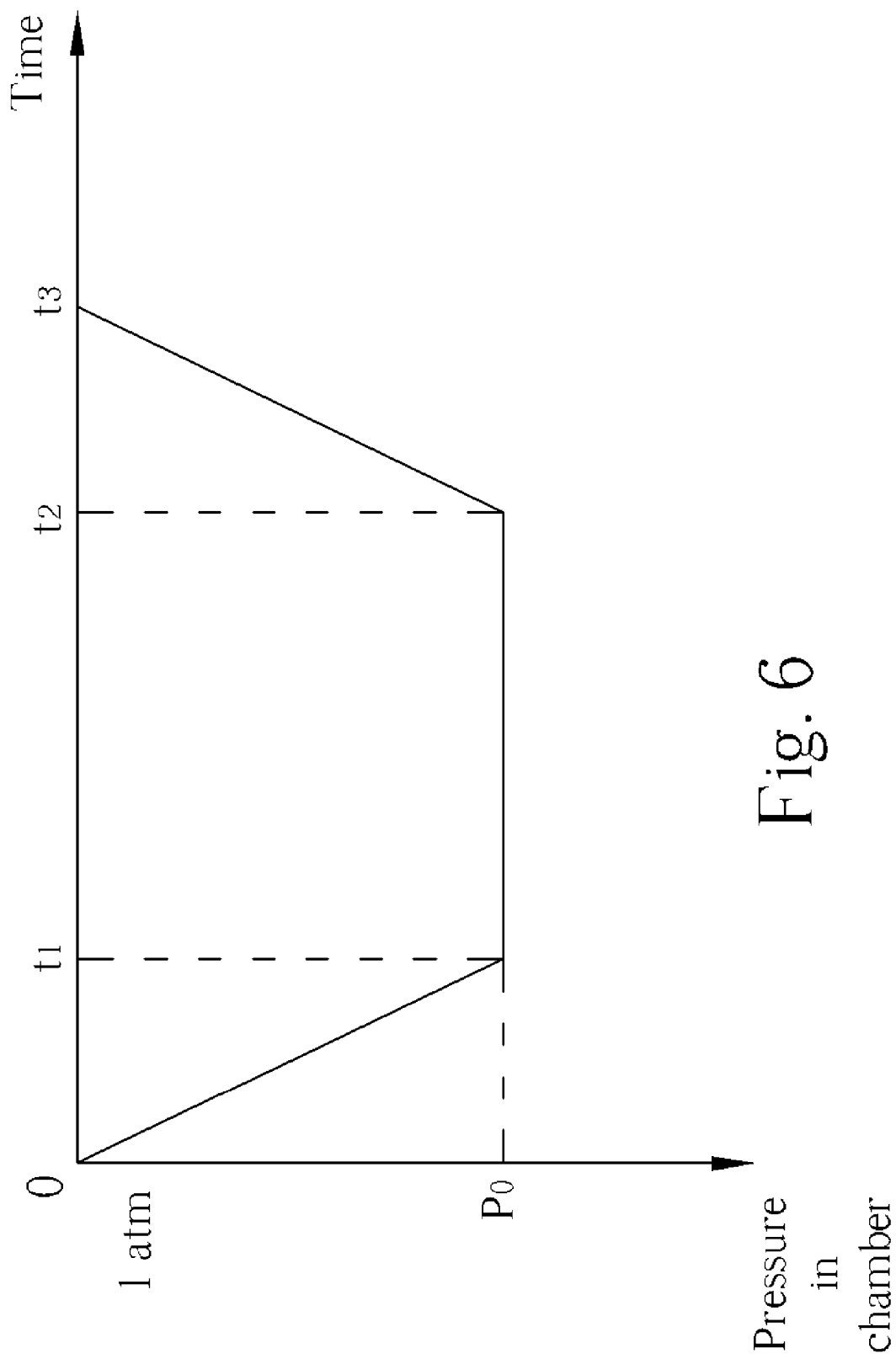
FIG. 6 shows a time-pressure plotting during the liquid crystal filling process according to the present invention.

Please refer to FIG. 6 showing a time-pressure plotting during the liquid crystal filling process in the liquid crystal injection chamber described above. During the time period of 0 to t1, the pressure in the chamber gradually decreases from 1 atm to a predetermined degree of vacuum P0, and the chamber is gradually heated to a predetermined temperature T0. P0<10 mPa, and T0 is about 30 to 80° C., preferably 65° C. During the time period of t1 to t2, the pressure and the temperature in the chamber are maintained at P0 and T0, respectively, and the two glass substrates 302 and 304 are aligned. After the assembly of the two glass substrates 302 and 304 is accomplished in time t2, during the next time period of t2 to t3, the pressure in the chamber gradually increases from the predetermined degree of vacuum to 1 atm and the temperature is gradually lowered from the predetermined temperature T0 to room temperature.

Figure 7:
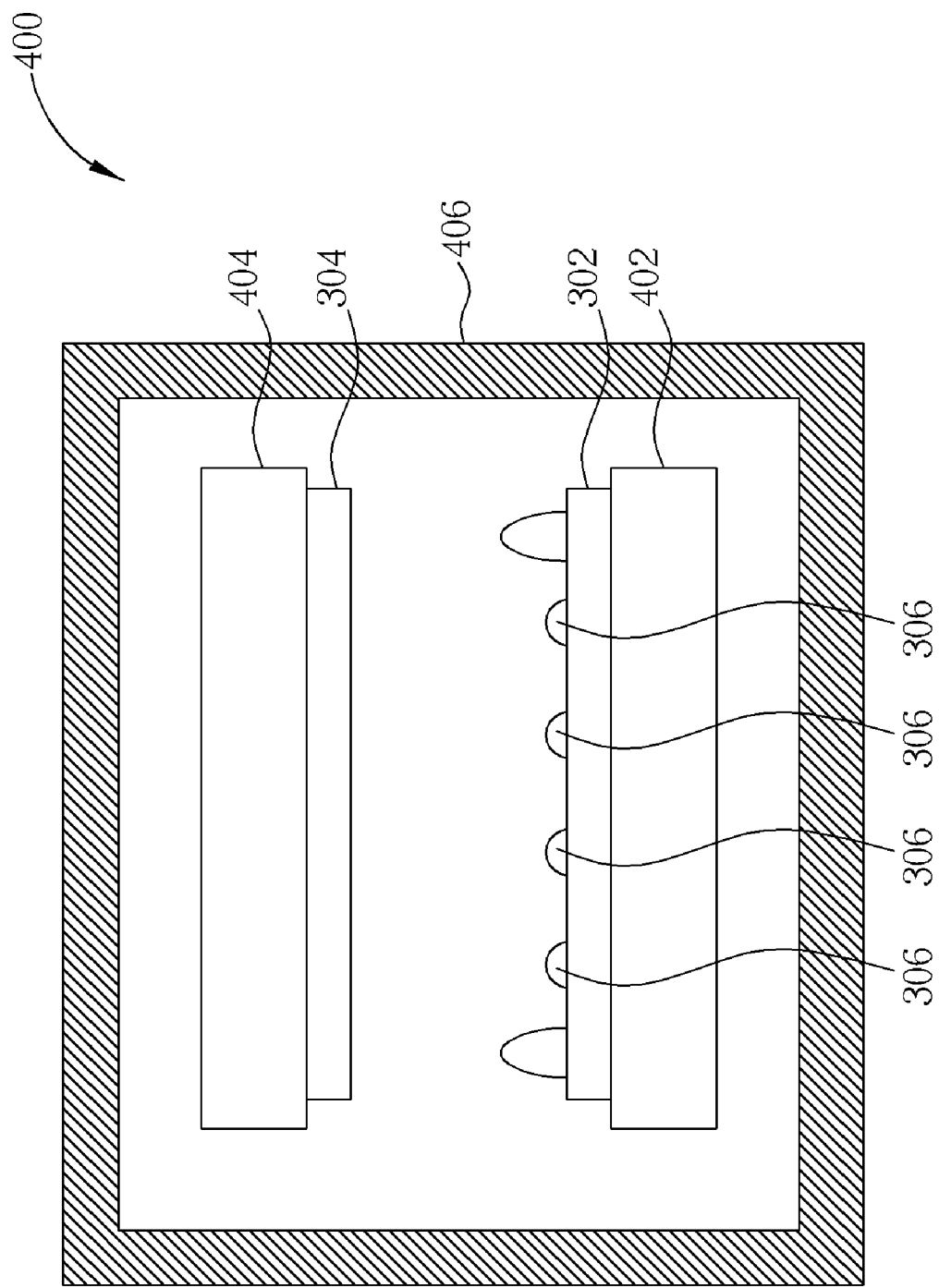
FIG. 7 is a schematic diagram showing a liquid crystal filling chamber according to the present invention.

Furthermore, as shown in FIG. 7, the heating method for the liquid crystal injection chamber 400 can be performed in three ways. One is to heat the substrates 302, 304 by means of contact transfer through a heating device (not shown), such as, a heating filament or a fixed heating pipe having a heat medium (such as, heated water or air) loaded therein, set inside or on the side of the stage 402 supporting the glass substrate 302 and the stage 404 adsorbing the glass substrate 304. Another is to heat the substrates 302, 304 by means of convection of hot air or radiation in vacuum through the heating device (not shown) installed on the inner wall of the cavity 406 of the liquid crystal injection chamber 400. The example of the heating device is a heating filament for heating the substrates by means of convection before the cavity 406 reaches a predetermine degree of vacuum P0, or an IR heater to heat the substrates by means of convection of hot air and radiation in vacuum. The other is to pre-heat the two glass substrates 302, 304 to a relative high temperature, such as, 120° C., before they are placed in the liquid crystal injection chamber 400, and when the temperature is lowered to the predetermined temperature T0, the alignment and the sealing are performed in the cavity 406.

As compared to a conventional method of manufacturing an LCD panel, in the manufacturing method of the present invention, a step of heating is performed on the two glass substrates 302 and 304 during the filling process of liquid crystal. In addition, the LCD panel 300 is assembled in a high temperature ambient, and in this situation, the pressures outside and inside of the LC cavity 310 are equal, that is, the force F1 as shown in FIG. 1 is equal to 0. Therefore, the LCD panel 300 at a high temperature also can satisfy the relation of F1+F2>F3 and the gravity mura will be prevented.

Figure 9:
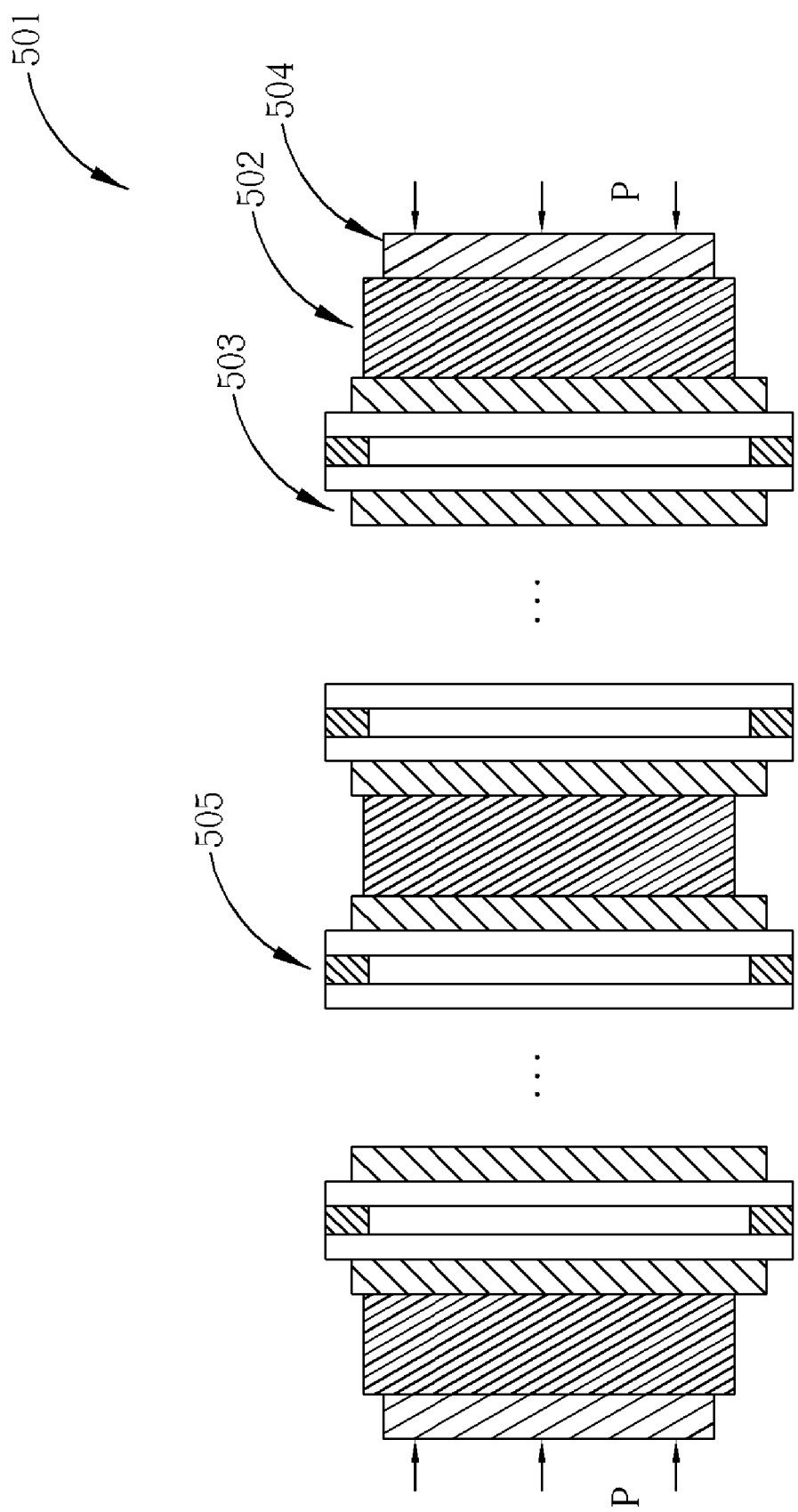
FIG. 9 is a schematic diagram showing an embodiment of the heating apparatus according to the present invention.

Please prefer to FIG. 9, a schematic diagram showing an embodiment of the heating apparatus according to the present invention. The heating apparatus 501 comprises a plurality of heat conducting plates 502, a plurality of buffer plates 503, and a pressing device 504.

Figure 10:
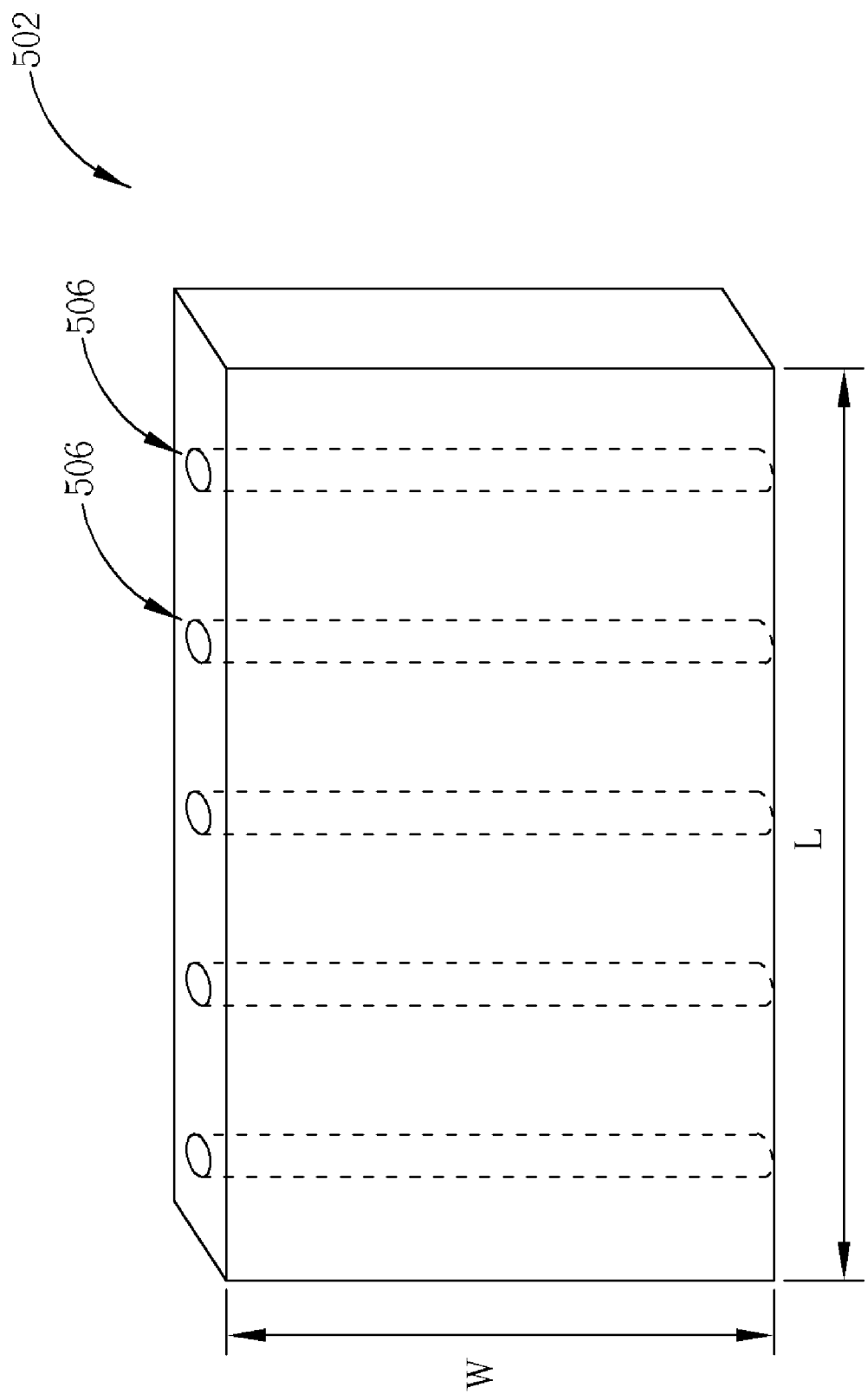
FIG. 10 is a schematic diagram showing an embodiment of the heating plate in the heating apparatus according to the present invention.

The heat conducting plates 502 are disposed to stack each other. The two sides of each heat conducting plate 502 have a heating surface, respectively, such that one or more display panels can be heated between each two heat conducting plates 502. The heat conducting plate 502 may further comprises an electrical heating element, such as, a heating rod, a heating sheet, and a heating filament, arranged in the heat conducting plate 502 in a way to attain a uniform temperature on the surface of the heat conducting plate 502. Please refer to FIG. 10, a schematic diagram showing an embodiment of the heating plate 502 having heating rods 506 in the heating apparatus 501 according to the present invention. When the heat conducting plate 502 performs heating, the temperature is limited according to the material of the substrates, liquid crystal, and the buffer plate. It is suggested to be 50 to 150° C., generally. The disposition of the heat conducting plates 502 is not particularly limited, and preferably at the direction of perpendicular to the horizontal. The length (L) and the width (W) of the heating surface are preferably less than the length and the width of display panels.

The buffer plates 503 are arranged against each heating surfaces, and will be between the heating conducting plate 502 and the panel 505 during the panel heating, for the function of buffering in the subsequent step of pressing, to protect the panels. The material for the buffer plate is not particularly limited, as long as the material has properties of impact resistance and can endure pressures between the heat conducting plate 502 and the panel 505. The softening point should be higher than or equal to the heating temperature at the heat conducting plate 502. For example, polyfone based buffer material is suitable in the present invention.

The pressing device 504 is used to press the heat conducting plate 502, such that a relative pressure is formed between each two adjacent heat-conducting plates 502. A mechanical force (such as a forcing plate or an air bag) can be used to press the two most out heat conducting plates 502 to produce a predetermined pressure by the pressing device 504, for the purpose of pressing on the panel.

During the end-seal process using the heating apparatus 504 described above, one or more panels disposed between each two adjacent heat conducting plates 502 are heated or pressed from the attached buffer plates 503, and the panels are fastened by the buffer plates 503.

Figure 11:
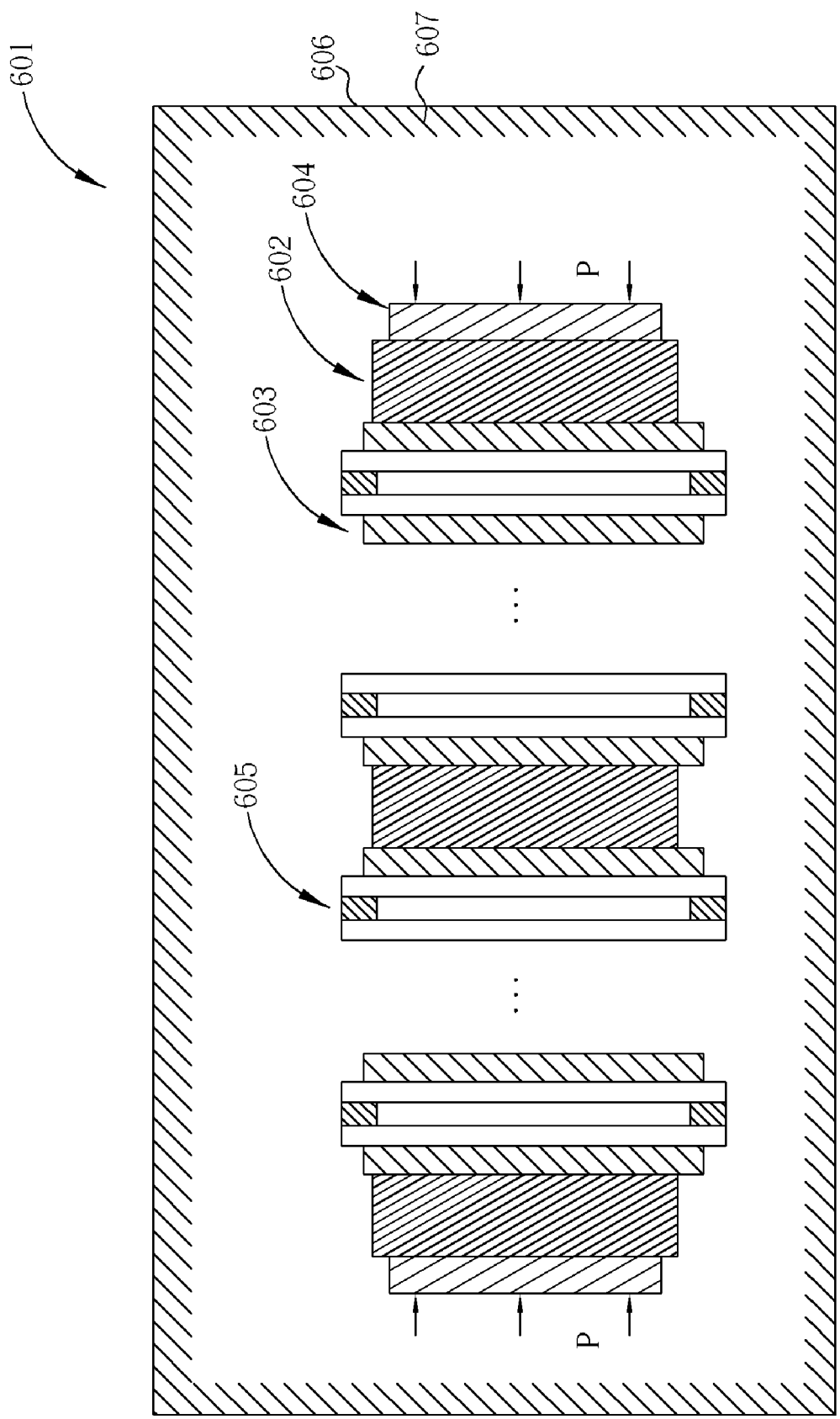
FIG. 11 is a schematic diagram showing an embodiment in another aspect of the heating apparatus according to the present invention.

Please prefer to FIG. 11, a schematic diagram showing an embodiment of the heating apparatus in another aspect according to the present invention. The heating apparatus 601 comprises a heating chamber 606, a plurality of heat conducting plates 602, a plurality of buffer plates 603, and a pressing device 604.

The heating chamber 606 has heating elements (such as 607) in the heating chamber or out of the heating chamber, to heat the panels 605. The heating elements may be infrared tubes, heating rods, heating sheets, or heating filaments arranged in a way to attain a uniform temperature on the surfaces of the heat conducting plates 602. After the heat conducting plates 602 obtain the heat, they transfer the heat to the panels 605 through the heating surfaces by means of heat transfer, with the same function of the heat conducting plates 502 mentioned above. The length and the width of the heating surface are preferably less than the length and the width of display panels. The functions of the buffer plates 603 and the pressing device 604 are the same as those of the buffer plates 503 and the pressing device 504.

Figure 12:
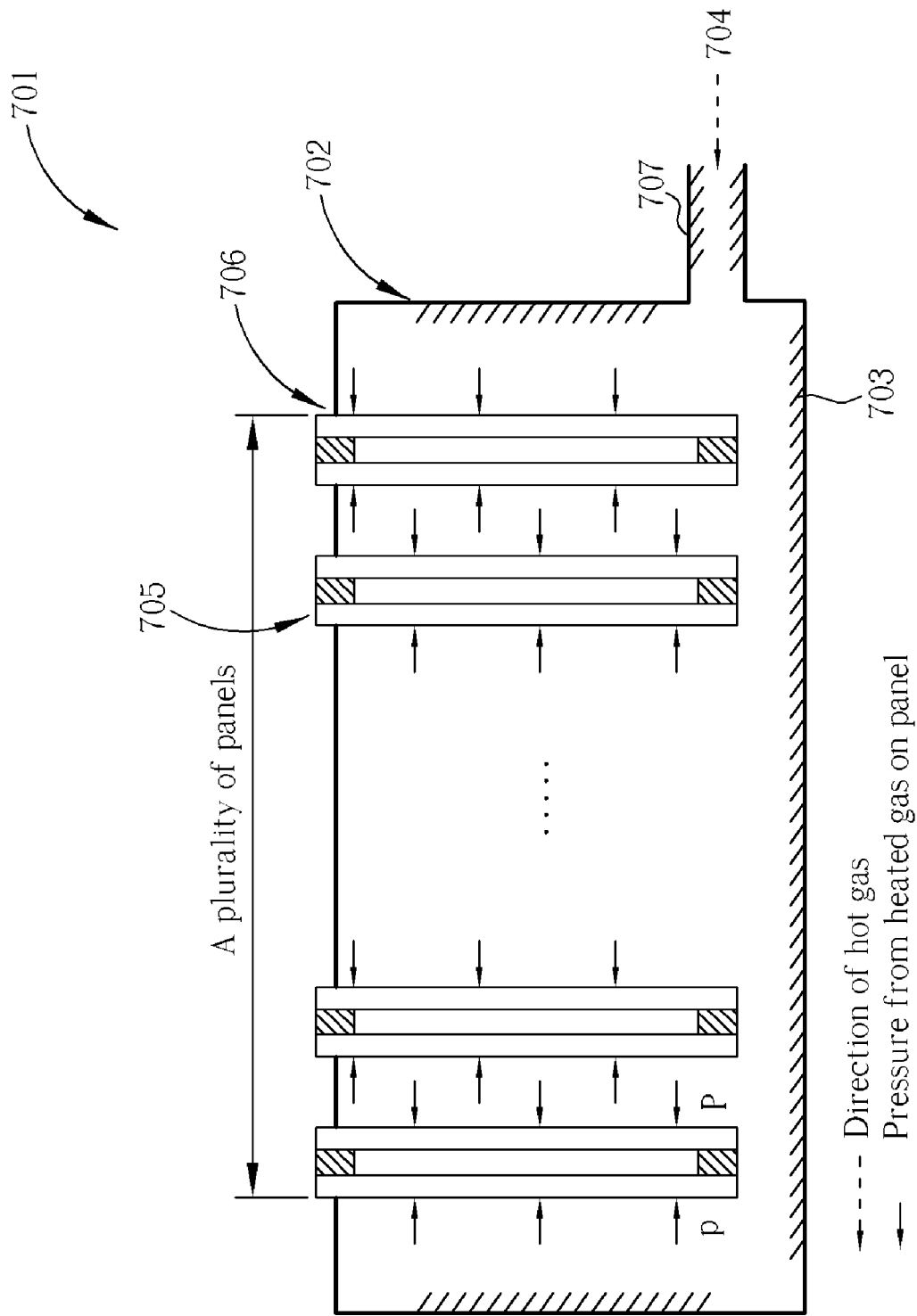
FIG. 12 is a schematic diagram showing an embodiment in still another aspect of the heating apparatus according to the present invention.

Please refer to FIG. 12, a schematic diagram showing an embodiment in still another aspect of the heating apparatus according to the present invention. The heating apparatus 701 comprises a pressing chamber 702, a heating element 703, and a pressing device (not shown).

The pressing chamber 702 comprises a gas inlet 704 for the entrance of gas as a heating or pressing medium and at least one slot 706 for the fixation of the LCD panel.

The heating elements 703 positioned on the external or inner wall of the pressing chamber 702 or at the gas inlet 707, to heat the gas in the pressing chamber 702, and in turn heat the display panel 705 on the slot 706. The heating elements 703 may be infrared tubes, heating rods, heating sheets, or heating filaments, arranged in a way to attain a uniform temperature inside the pressing chamber 702. The pressing chamber 702 contains gas, preferably an inert gas, such as helium, neon, argon, krypton, nitrogen, etc, not reactive to the apparatus or panels. When the pressing chamber 702 is heated, the temperature is limited to not affect the LCD panels 705 and is generally 50 to 150° C., depending on the material of the liquid crystal and the substrates. The direction for the slot 706 disposition is not particularly limited, and preferably to allow the LCD panels 705 disposed in the direction perpendicular to the horizontal.

The pressing device (not shown) disposed inside or outside the pressing chamber 701 to compress the gas in the pressing chamber 701. The gas after the compression produces a pressure exerted to the LCD panels, to achieve the function of pressing for use in the end-seal process according to the present invention.

The heating apparatus according to the present invention as described above can be conveniently utilized in the end-seal process for the LCD panel to meet the requirement of pressing and heating simultaneously in the end-seal process according to the present invention, and the panels treated can be one or more, and furthermore, also suitable in the manufacturing of large size display panels.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of manufacturing a liquid crystal display panel, comprising:

providing a first substrate and a second substrate, the first substrate having a first sealant used for sealing with the second substrate to form a liquid crystal cavity;

placing the first substrate and the second substrate in a chamber to perform a liquid crystal filling process; and performing an end-seal process at a predetermined temperature higher than room temperature to seal the liquid crystal with a predetermined weight into the liquid crystal cavity, wherein the end-seal process comprises:

heating the first and the second substrate to the predetermined temperature;

applying a first predetermined pressure to the first and the second substrate;

maintaining the predetermined temperature and the first predetermined pressure for a first time period;

reducing the first predetermined pressure applied to the first and the second substrate to a second predetermined pressure;

sealing the first and the second substrate at the predetermined temperature;

maintaining the predetermined temperature and the second predetermined pressure for a second time period; and removing the second predetermined pressure and lowering the predetermined temperature to room temperature.

2. The method of claim 1, wherein the predetermined temperature is in the range of 30 to 80° C.

3. The method of claim 1, wherein, during the liquid crystal filling process, further comprising the step of maintaining the temperature of the first substrate and the second substrate in the range of 30 to 80° C.

4. The method of claim 1, wherein the predetermined weight is 95% to 99.5% of a standard liquid crystal filling weight.

5. The method of claim 4, wherein the standard liquid crystal filling weight is the weight of liquid crystal filled into the liquid crystal cavity and make the surfaces of the first and second substrates flat at room temperature.

6. The method of claim 1, wherein the liquid crystal cavity comprises a liquid crystal injection hole, and the liquid crystal filling process is performed by injecting the liquid crystal into the liquid crystal cavity through the liquid crystal injection hole.

7. The method of claim 6, wherein the end-seal process comprises the step of filling a second sealant in the liquid crystal injection hole and curing the second sealant.

8. The method of claim 7, wherein the step of curing the sealant is performed by ultraviolet irradiation.

9. The method of claim 1, wherein the first predetermined pressure is in the range of $3.0 \times 10^4$ to $6.5 \times 10^4$ Pa.

10. The method of claim 1, wherein the second predetermined pressure is in the range of $2.0 \times 10^4$ to $5.0 \times 10^4$ Pa.

11. The method of claim 1, wherein the first time period is proportional to the area of the liquid crystal display panel.

12. The method of claim 1, wherein the second time period is proportional to the area of the liquid crystal display panel.

13. The method of claim 1, wherein the first time period is longer than the second time period.

14. The method of claim 1, wherein a heating apparatus is used in the end-seal process for heating the first and second substrates to the predetermined temperature.

15. The method of claim 14, wherein the heating apparatus comprises:
   a plurality of heat conducting plates;
   a plurality of buffer plates disposed between the liquid crystal display panel
   and the heat conducting plate respectively; and
   a pressing device disposed at the most out heat conducting plate.

16. The method of claim 15, wherein the heat conducting plates further comprise a heating element selected from a heating rod, a heating sheet, and a heating filament.

17. The method of claim 15, wherein the heat conducting plates have a temperature lower than the softening point of the buffer plates when heating the first and second substrates.

18. The method of claim 15, wherein the heat conducting plates have a temperature in the range of 50 to 150° C. when heating the first and second substrates.

19. The method of claim 15, wherein the heat conducting plates have a length and a width less than the length and the width of the first and second substrates respectively.

20. The method of claim 15, wherein the heating apparatus further comprises a heating chamber, and the first and second substrates, the heat conducting plates, the buffer plates, and the pressing device are in the heating chamber.

21. The method of claim 20, wherein the heating chamber further comprises a heating element selected from an infrared tube, a heating rod, a heating sheet, and a heating filament.

22. The method of claim 14, wherein the heating apparatus comprises:
   a heating chamber comprising a gas inlet for conducting a gas into the heating chamber and a plurality of slots for placing the first and second substrates;
   a heating element disposed on the wall of the heating chamber to heat the gas in the heating chamber; and
   a pressing device disposed at the heating chamber for compressing the gas.

23. The method of claim 22, wherein the heating element is selected from an infrared tube, a heating rod, a heating sheet, and a heating filament.

24. The method of claim 22, wherein the gas is an inert gas.

25. The method of claim 22, wherein the gas has a temperature in the range of 50 to 150° C.

* * * * *

UNITED STATES PATENT AND TRADEMARK OFFICE
CERTIFICATE OF CORRECTION

| | |
|---|---|
| PATENT NO. | : 7,548,300 B2 |
| APPLICATION NO. | : 10/907958 |
| DATED | : June 16, 2009 |
| INVENTOR(S) | : Chien-Ming Chen et al. |

It is certified that error appears in the above-identified patent and that said Letters Patent is hereby corrected as shown below:

On the title page, item (73), correct the residence of the Assignee from "Tao-Hsien" to "Tao-Yuan Hsien"

Signed and Sealed this

Twenty-seventh Day of October, 2009

David J. Kappos
*Director of the United States Patent and Trademark Office*